United States Patent
Takenouchi et al.

(10) Patent No.: US 10,638,739 B2
(45) Date of Patent: May 5, 2020

(54) FISHING LINE GUIDE MEMBER, AND FISHING LINE GUIDE AND FISHING ROD PROVIDED WITH THE SAME

(71) Applicants: KYOCERA Corporation, Kyoto-shi, Kyoto (JP); FUJI KOGYO CO., LTD., Shizuoka-shi, Shizuoka (JP)

(72) Inventors: Kazunori Takenouchi, Kyoto (JP); Kazuaki Takigawa, Kyoto (JP); Yuki Sonoda, Kyoto (JP); Kazuhito Omura, Shizuoka (JP)

(73) Assignees: KYOCERA Corporation, Kyoto (JP); Fuji Kogyo Co., Ltd., Shizuoka (JP)

( * ) Notice: Subject to any disclaimer, the term of this patent is extended or adjusted under 35 U.S.C. 154(b) by 220 days.

(21) Appl. No.: 14/415,103

(22) PCT Filed: Jan. 27, 2014

(86) PCT No.: PCT/JP2014/051710
§ 371 (c)(1),
(2) Date: Jan. 15, 2015

(87) PCT Pub. No.: WO2014/119522
PCT Pub. Date: Aug. 7, 2014

(65) Prior Publication Data
US 2015/0201595 A1 Jul. 23, 2015

(30) Foreign Application Priority Data

Jan. 31, 2013 (JP) .................................. 2013-017655
Jul. 26, 2013 (JP) .................................. 2013-155379

(51) Int. Cl.
*A01K 87/04* (2006.01)

(52) U.S. Cl.
CPC .................................. *A01K 87/04* (2013.01)

(58) Field of Classification Search
CPC .... A01K 87/04; C04B 35/584; C04B 35/591; C04B 35/58; A44C 5/00
(Continued)

(56) References Cited

U.S. PATENT DOCUMENTS 2,502,845 A * 4/1950 Hoffman ................ A01K 87/04
29/463
6,067,743 A * 5/2000 Ohmura ................ A01K 87/04
43/24
(Continued)

FOREIGN PATENT DOCUMENTS

EP 2386532 A2 * 11/2011 ........... C04B 35/584
JP 05-153887 A 6/1993
(Continued)

OTHER PUBLICATIONS

International Search Report dated Apr. 23, 2014 issued in counterpart International Application No. PCT/JP2014/051710.
(Continued)

*Primary Examiner* — Kathleen I Alker
*Assistant Examiner* — Jeffrey R Larsen
(74) *Attorney, Agent, or Firm* — Procopio Cory Hargreaves and Savitch LLP

(57) ABSTRACT

A fishing line guide member is formed in a ring shape, and has a curve surface curved from an inner circumferential side toward an outer circumferential side in a cross-sectional view with respect to a cross-section of the fishing line guide member taken along a cut plane including an axis line of the fishing line guide member. In an inner circumferential side part of the curve surface, R1 is larger than R2, in which R1 denotes a curvature radius of an axial center side part of the curve surface and R2 denotes a curvature radius of an axial end side part of the curve surface.

7 Claims, 12 Drawing Sheets

(58) Field of Classification Search
USPC .................. 43/24, 18.1 R, 18.5; 428/31, 325
See application file for complete search history.

(56) References Cited

U.S. PATENT DOCUMENTS

| | | | |
|---|---|---|---|
| 7,642,209 B2 * | 1/2010 | Okawa .................. | B82Y 30/00 264/647 |
| 8,377,837 B2 * | 2/2013 | Takao ................. | C04B 35/5935 384/492 |
| 2009/0165355 A1 | 12/2009 | Jeong | |
| 2011/0010922 A1 | 1/2011 | Jeong | |

FOREIGN PATENT DOCUMENTS

| | | | |
|---|---|---|---|
| JP | 08-295568 A | 11/1996 | |
| JP | 9-163900 A | 6/1997 | |
| JP | 2009-159959 A | 6/2009 | |
| JP | 2011-067165 A | 4/2011 | |
| JP | 2011-067166 A | 4/2011 | |

OTHER PUBLICATIONS

Decision to grant patent dated Dec. 16, 2014 issued in counterpart Japanese Application No. 2014-551473.

\* cited by examiner (a)

FISHING LINE REWINDING DIRECTION (b)

FISHING LINE REWINDING DIRECTION (a)

(b)

FISHING LINE GUIDE MEMBER, AND FISHING LINE GUIDE AND FISHING ROD PROVIDED WITH THE SAME

TECHNICAL FIELD

The present invention relates to a fishing line guide member, and a fishing line guide and a fishing rod provided with the same.

BACKGROUND ART

In general, a fishing line guide attached to a fishing rod is configured of a hard fishing line guide member referred to as a line guide ring, a holding portion having a shape capable of fitting the fishing line guide member to an inner circumferential portion of the holding portion, and an attachment portion for attaching the fishing line guide to the fishing rod. Moreover, the fishing line guide member is formed in a ring shape so that a fishing line drawn out from a reel is inserted into the fishing line guide member and is guided, and metal or ceramics having excellent abrasion resistance is adopted as a material of the fishing line guide member.

In recent years, in order to decrease the influence of a load generated at a contact portion between the guided fishing line and the fishing line guide member, various fishing line guide members are suggested. For example, in Patent Literature 1, a fishing line guide member for a reel fishing rod is suggested, in which a guide hole in which one portion or two or more portions of an inner circumferential portion of a guide ring which is a fishing line guide member are formed in outwardly recessed portions is provided, and compared to a precise circular guide hole, an area on which the fishing line comes into contact with the guide ring is simply decreased.

CITATION LIST

Patent Literature

Patent Literature 1: Japanese Unexamined Patent Publication JP-A 9-163900 (1997)

SUMMARY OF INVENTION

Technical Problem

However, in many fishing line guide members based on the related art such as the fishing line guide member described in Patent Literature 1, a region on which the fishing line comes into contact with the fishing line guide member and slides is small in a cross-sectional view with respect to a cross-section of the fishing line guide member taken along a cut plane including an axis line of the fishing line guide member, and when the fishing line slides on the inner circumferential surface of the fishing line guide member, a pressure (face pressure) which is in a direction perpendicular to the inner circumferential surface and is applied to the fishing line is increased, and thus, there is a problem that the fishing line is prone to breaking.

The invention is made to solve the above-described problems, and an object thereof is to provide a fishing line guide member by which a fishing line is less prone to breaking, and a fishing line guide and a fishing rod provided with the same.

Solution to Problem

A fishing line guide member of the invention has a ring shape and a curve surface curved from an inner circumferential side toward an outer circumferential side in a cross-sectional view with respect to a cross-section of the fishing line guide member taken along a cut plane including an axis line of the fishing line guide member, and in an inner circumferential side part of the curve surface, R1 is larger than R2, in which R1 denotes a curvature radius of an axial center side part of the curve surface and R2 denotes a curvature radius of an axial end side part of the curve surface, and R3 being equal to or more than R2, in which R3 denotes a curvature radius of a curve surface extending from one end of the inner circumferential side part of the curve surface to one outer circumferential side.

A fishing line guide of the invention comprises: the fishing line guide member; a holding portion which holds the fishing line guide member; and an attachment portion which attaches the holding portion to the fishing rod.

A fishing rod of the invention comprises: a rod body; and the fishing line guide mentioned above which is attached to the rod body.

Advantageous Effects of Invention

According to a fishing line guide member of the invention, a region on which a fishing line slides can be increased. Accordingly, when the fishing line slides on an inner circumferential surface of a fishing line guide member, it is possible to suppress an increase of a pressure which is applied to the fishing line and is perpendicular to the inner circumferential surface of the fishing line guide member, and thus, abrasion of the fishing line can be suppressed, and the fishing line is less prone to breaking.

According to a fishing line guide of the invention, the fishing line is less prone to breaking by abrasion.

According to a fishing rod of the invention, a break of the fishing line during fishing, that is, occurrence of a so-called line break is decreased, and stable fishing can be performed over a long time.

BRIEF DESCRIPTION OF DRAWINGS

Other and further objects, features, and advantages of the invention will be more explicit from the following detailed description taken with reference to the drawings wherein:

FIG. 1 shows an example of the fishing line guide member of the present embodiment, wherein FIG. 1(a) is a front view, FIG. 1(b) is a side cross-sectional view taken along the line Z-Z' shown in FIG. 1(a), and FIG. 1(c) is an enlarged view of an A portion in the side cross-sectional view of FIG. 1(b);

FIG. 5 shows another example of the fishing line guide member of the present embodiment, wherein FIG. 5(a) is a front view, FIG. 5(b) is a side cross-sectional view taken along the line Z-Z' shown in FIG. 5(a), and FIG. 5(c) is an enlarged view of an A portion in the side cross-sectional view of FIG. 5(b);

FIG. 6 shows another example of the fishing line guide member of the present embodiment, wherein FIG. 6(a) is a front view, FIG. 6(b) is a side cross-sectional view taken along the line Z-Z' shown in FIG. 6(a), and FIG. 6(c) is an enlarged view of an A portion in the side cross-sectional view of FIG. 6(b);

FIG. 7 is a schematic view showing an example of a fishing line guide to which the fishing line guide member of the present embodiment is held, wherein FIG. 7(a) is a front view, and FIG. 7(b) is a side cross-sectional view taken along the line Y-Y' shown in FIG. 7(a);

DESCRIPTION OF EMBODIMENTS

Hereinafter, an example of a fishing line guide member 1 of the present embodiment will be described.

Figure 1:
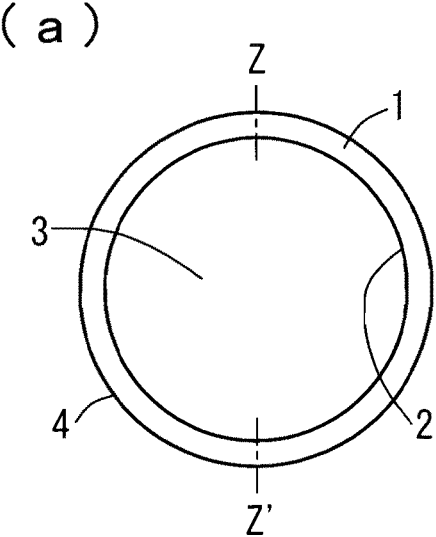
Figure 1:
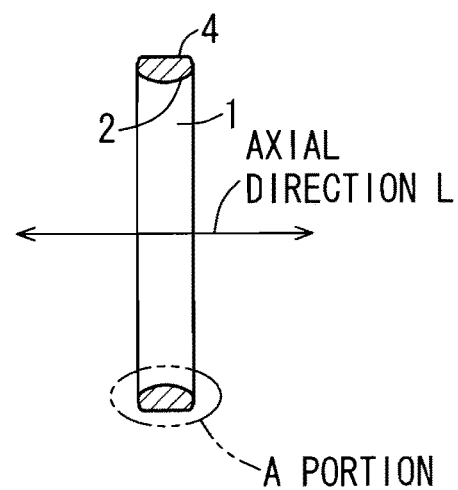
Figure 1:
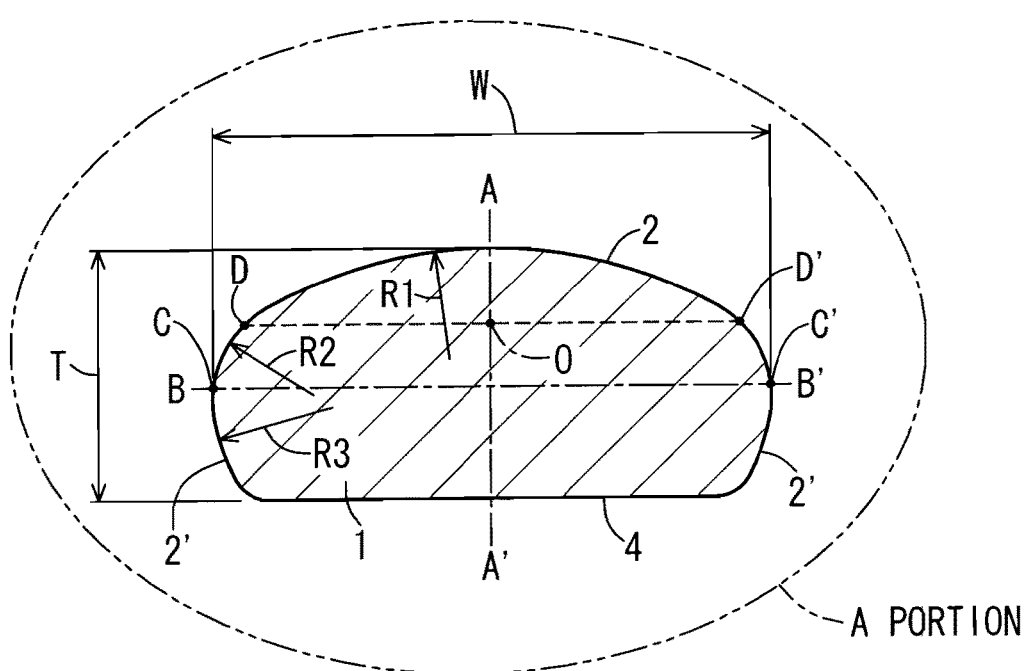

FIG. 1 shows an example of the fishing line guide member 1 of the present embodiment, wherein FIG. 1(a) is a front view, FIG. 1(b) is a side cross-sectional view taken along the line Z-Z' shown in FIG. 1(a), and FIG. 1(c) is an enlarged view of an A portion in the side cross-sectional view of FIG. 1(b).

As shown in FIGS. 1(a) to 1(c), the fishing line guide member 1 of the present embodiment is formed in a ring shape, and a space of an inner circumferential side of the ring shaped fishing line guide member 1 becomes a guide hole 3 of a fishing line. A line passing through a center of the guide hole 3 becomes an axis line of the fishing line guide member. In FIG. 1(b), it is illustrated that a direction L (a direction perpendicular to a paper surface in FIG. 1(a), and hereinafter, referred to as an axial direction L) indicated by the axis line becomes the direction in which the fishing line (not shown) passes through. In addition, in FIG. 1(c), a dashed line shown by A-A' perpendicular to the axial direction L indicates a position at which a thickness (a dimension in a radial direction) of the fishing line guide member 1 becomes the maximum thickness T, and a dashed line shown by B-B' parallel to the axial direction L indicates a position at which a width (a dimension in the axial direction) of the fishing line guide member 1 becomes the maximum width W.

The fishing line guide member 1 of the present embodiment is formed in a curve surface curved from the inner circumferential side to the outer circumferential side in a cross-sectional view with respect to a cross-section of the fishing line guide member taken along a cut plane including the axis line (hereinafter, occasionally simply referred to as a cross-sectional view). Moreover, in the cross-sectional view, a curve surface positioned at the inner circumferential side from line B-B' which is the maximum width W is referred to as an inner circumferential side part 2 of the curve surface (hereinafter, referred to as a first curve surface 2). Moreover, the first curve surface 2 includes two or more curve surfaces having a different curvature radius. Specifically, when the first curve surface 2 includes two curve surfaces, in the cross-section shown in FIG. 1(c), the first curve surface 2 is composed of an axial center side part of the curve surface (hereinafter, occasionally simply referred to as a center side curve surface) which is a portion at which the first curve surface 2 and line A-A' intersect each other, and axial end side parts of the curve surface (hereinafter, occasionally referred to as an end side curve surface) which are disposed at both sides while interposing the center side curve surface in the first curve surface 2. As described below, the curvature radius of the center side curve surface and the curvature radius of the end side curve surface are different from each other.

Moreover, in the cross-section shown in FIG. 1(c), endpoints of the center side curve surface are indicated by points D and D', and endpoints opposite to the endpoints (points D and D') at the boundary between the center side curve surface and the end side curve surfaces in the endpoints of the end side curve surfaces are indicated by points C and C'. That is, in the cross-section, the shape of the center side curve surface is shown by an arc D^D' and the shapes of the end side curve surfaces are shown by an arc C^D and an arc D'^C'.

Here, in the present embodiment, from the viewpoint of symmetry, it is more preferable that an intersection between line A-A' and chord D-D' is a middle point O of chord D-D'. However, the intersection between line A-A' and chord D-D' and the middle point O of chord D-D' may be deviated from each other. In addition, when the first curve surface 2 includes three or more curve surfaces, in the cross-section, a curve surface on which the intersection between line A-A' and the first curve surface 2 exists is set to the center side curve surface, curve surfaces which are positioned to interpose the center side curve surface and on which the intersection between line B-B' and the first curve surface 2 are set to the end side curve surfaces, and other curve surfaces having the curvature radius different from those of the center side curve surface and the end side curve surfaces may be provided. Moreover, with respect to each curve surface, when a plurality of arbitrary points are selected on the curve surface, the curvature radii within the selected range are measured, and the curvature radii are different from each other, by repeatedly selecting a plurality of arbitrary points including the different portion and measuring the curvature radius, the range of the curve surface can be confirmed.

In addition, in the fishing line guide member 1, in the cross-sectional view, the surface extending from one end (C' point) of the first curve surface 2 to one outer circumference 4 side becomes a curve surface 2' (hereinafter, referred to as a second curve surface 2'). That is, in the present embodiment, the curve surface from the inner circumferential side toward the outer circumferential side is composed of the first curve surface 2 and the second curve surface 2'. In other words, in the cross-section shown in FIG. 1(c), the curve surface from the inner circumferential side toward the outer circumferential side is the surface which extends toward the outer circumference 4 of the fishing line guide member 1 with the intersection between the first curve surface 2 and A-A' as the starting point. In addition, in the fishing line guide member 1 shown in FIG. 1, the surface extending from the other end (C point) of the first curve surface 2 to the other outer circumference 4 side also becomes a curve surface, and the one curve surface and the other curve surface have a relationship of a line symmetry (or an approximately symmetric line). Also in the following description, when it is described with reference to the shape shown in FIG. 1, the other curve surface will be described using the same numeral reference as the one curve surface.

Moreover, when the fishing line slides on the inner circumferential surface of the fishing line guide member 1, the first curve surface 2 comes into contact with the fishing line and becomes a region on which the fishing line can slide.

In addition, in the inner circumferential side of the fishing line guide member 1, when the curvature radius of the center side curve surface is defined as R1 (hereinafter, occasionally simply referred to as R1) and the curvature radius of the end side curve surface is defined as R2 (hereinafter, occasionally simply referred to as R2), R1 is larger than R2. According to this configuration, the region on which the fishing line can slide can be increased. Accordingly, when the fishing line slides on the inner circumferential surface of the fishing line guide member 1, since it is possible to suppress an increase of a pressure which is applied to the fishing line and is perpendicular to the inner circumferential surface of the fishing line guide member 1, abrasion of the fishing line can be suppressed, and the fishing line is less prone to breaking.

Here, in the cross-section of the fishing line guide member 1, it may be assumed that R1 is the curvature radius of the center side curve surface on which the intersection between line A-A' and the first curve surface 2 exists, and R2 is the curvature radius of the end side curve surface on which the intersection between line B-B' and the first curve surface 2 exists. Moreover, a preferable range in actual dimensions of R1 and R2 is dependent on the dimension of the fishing line guide member 1. However, for example, according to the dimension of the fishing line guide member generally used, when the maximum thickness T is 0.2 to 3.0 mm and the maximum width W is 0.5 to 5.0 mm, R1 may be 0.5 to 8.0 mm, and R2 may be 0.1 to 1.0 mm.

In addition, according to the above-described configuration, two synergistic effects described below can be obtained.

Moreover, in the fishing line guide member 1, in the cross-sectional view, it is preferable that a value of a ratio T/W of the maximum thickness T with respect to the maximum width W is 0.2 or more and 0.7 or less. According to this configuration, high radial crushing strength of the fishing line guide member 1 is maintained, the curvature radius R1 of the center side curve surface is increased while the region on which the fishing line can slide is secured, and thus, the fishing line is even less prone to breaking.

Figure 2:
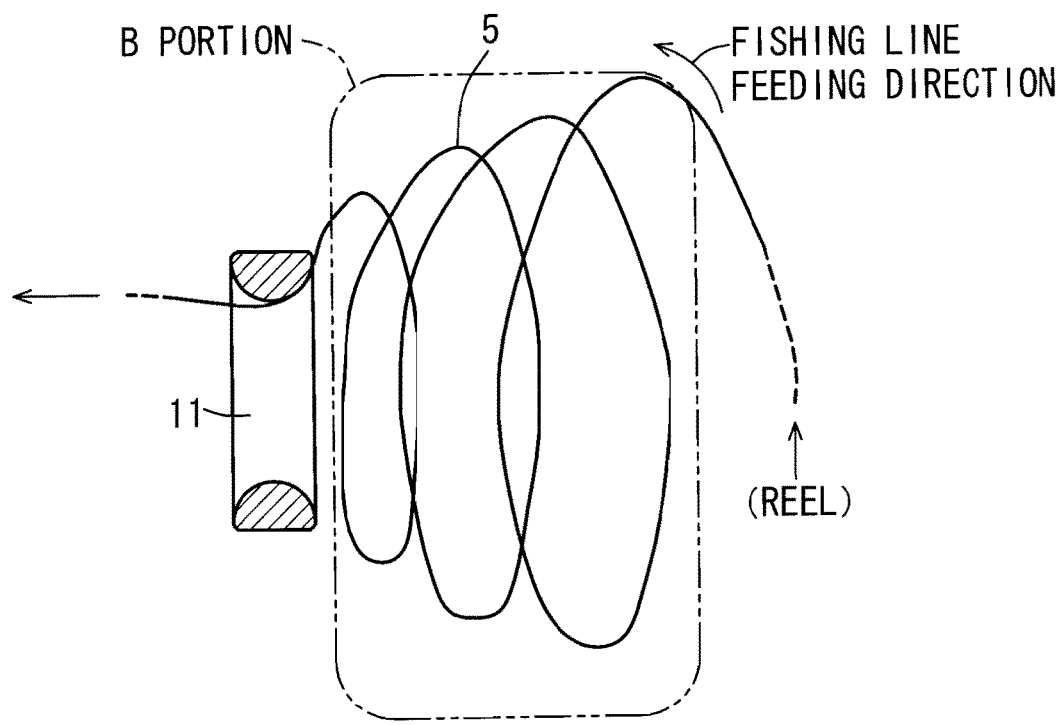
FIGS. 2(a) and 2(b) are cross-sectional views schematically showing the state of the fishing line fed from the reel to the fishing line guide members.
Figure 2:
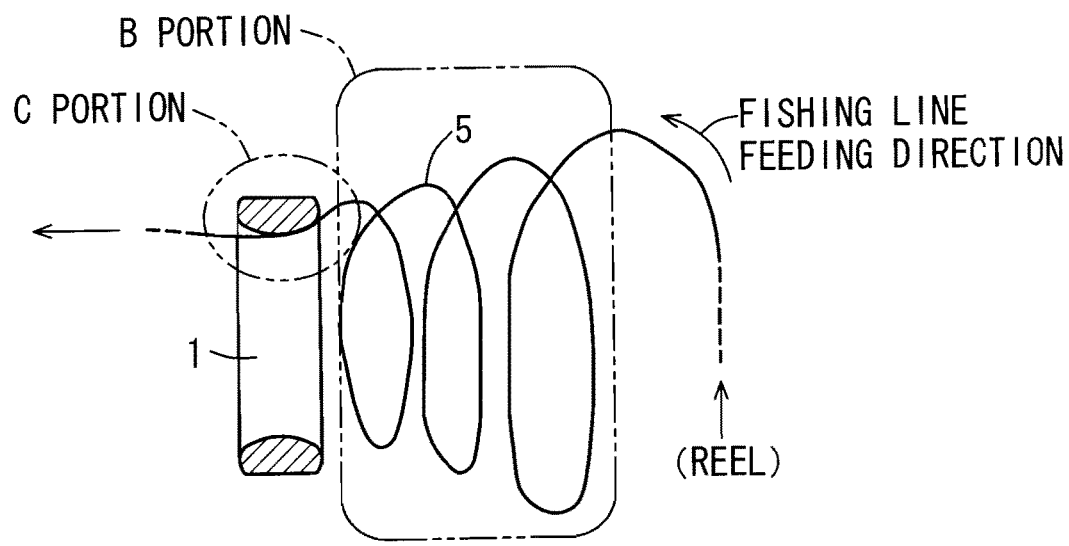

Hereinafter, a first synergistic effect of the fishing line guide member 1 will be described with reference to FIGS. 2 and 3.

FIGS. 2(a) and 2(b) are cross-sectional views schematically showing the state of the fishing line 5 fed from the reel to the fishing line guide members 1 and 11. In addition, the fishing line guide member 11 shown in FIG. 2(a) shows a reference aspect in which the curvature radius R1 of the center side curve surface of the first curve surface in the cross-section is smaller than the curvature radius R2 of the end side curve surface, and the fishing line guide member 1 shown in FIG. 2(b) shows the embodiment in which the curvature radius R1 of the center side curve surface of the first curve surface in the cross-section is larger than the curvature radius R2 of the end side curve surface.

Each of the fishing line guide members 1 and 11 is attached to a fishing rod (not shown) using a fishing line guide (not shown), the fishing line 5 discharged from the reel (not shown) is inserted into the guide hole 3 of each of the fishing line guide members 1 and 11, and the fishing line is guided to a tip top while sliding along the first curve surface 2 of the inner circumferential side of the fishing line guide member. In addition, FIGS. 2(a) and 2(b) show a state where the fishing line 5 is discharged from the reel. In a so-called spinning reel, the fishing line 5 which is discharged when a fishing rig is cast is discharged while being spirally rotated as shown in a B portion, the fishing line 5 which is spirally rotated comes into contact with the first curve surface of the inner circumferential side of each of the fishing line guide members 1 and 11, and the fishing line advances while being rotated along the inner circumferential surface and is discharged in the tip top direction.

Figure 3:
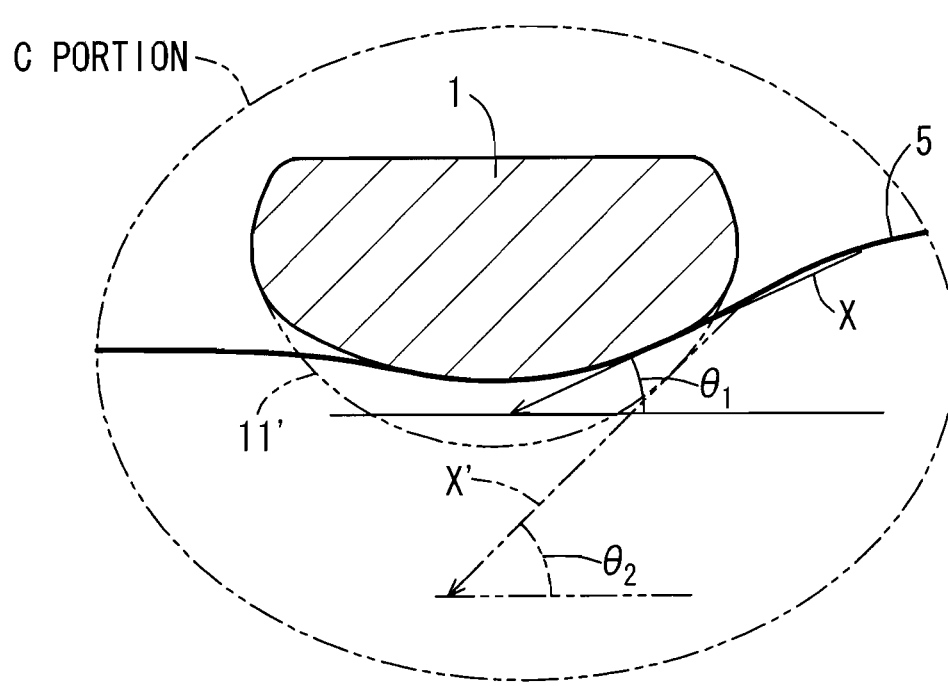
FIG. 3 is an enlarged view of a C portion of the fishing line guide member of FIG. 2(b)

FIG. 3 is an enlarged view of a C portion of the fishing line guide member 1 of FIG. 2(b). In addition, a two-dot chain line indicates an imaginary contour line 11' showing the inner circumferential surface of the fishing line guide member 11 which is shown as the reference aspect in FIG. 2(a). Moreover, an arrow X indicates an entrance direction of the fishing line 5 when the fishing line 5 comes into contact with the fishing line guide member 1, and an angle between the arrow X and the axis line of the fishing line guide member 1 is indicated by $\theta_1$ (hereinafter, referred to as an entrance angle $\theta_1$). In addition, an arrow X' indicates an entrance direction of the fishing line 5 when the fishing line 5 comes into contact with the fishing line guide member 11 (the imaginary contour line 11' indicating the inner circumferential surface of the fishing line guide member 11), and an angle between the arrow X' and the axis line of the fishing line guide member 1 is indicated by $\theta_2$ (hereinafter, referred to as an entrance angle $\theta_2$). Moreover, for easy understanding, in FIG. 3, the position of the axis line is shown to be appropriately deviated.

In the fishing line guide member 1, the curvature radius R1 is larger than the curvature radius R2 in the cross-section, in other words, the curvature radius of the end side curve surface is smaller than the curvature radius of the center side curve surface. Accordingly, when the fishing line 5 is fed from the reel to the fishing line guide member 1, the fishing line 5 and the end side curve surface is less prone to come into contact with each other, and compared to the case of the fishing line guide member 11, the position at which the fishing line 5 and the first curve surface 2 come into contact with each other is likely to approach the center side of the first curve surface 2. That is, since the entrance angle $\theta_1$ when the fishing line 5 comes into contact with the fishing line guide member 1 is smaller than the entrance angle $\theta_2$ in the case of the fishing line guide member 11, if the fishing line guide member 1 is used, a rotation diameter of the spiral rotation generated when the fishing line 5 is discharged from the reel is likely to be decreased. That is, since R1 is larger than R2 in the cross-section in the fishing line guide member 1, the rotation diameter of the spiral rotation generated when the fishing line 5 is discharged from the reel is likely to be decreased, and thus, a centrifugal force due to the spiral rotation can be suppressed. Accordingly, the following first synergistic effect can be exerted, that is, a burden on the fishing line 5 due to the centrifugal force is decreased, a decrease in a feeding speed of the fishing line 5 can be suppressed, and a flying distance in casting is increased.

Figure 4:
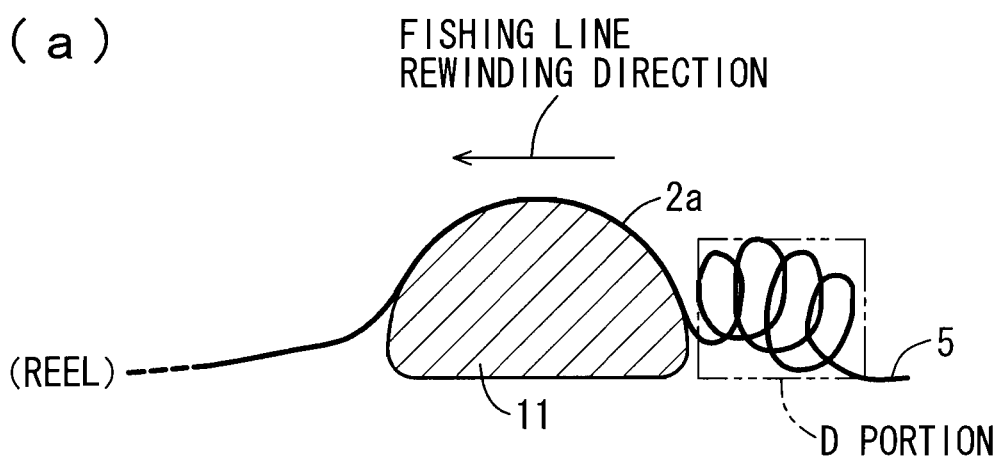
FIGS. 4(a) and 4(b) are cross-sectional views schematically showing the contact state between the fishing line guide member and the fishing line when the fishing line discharged from the reel is rewound.
Figure 4:
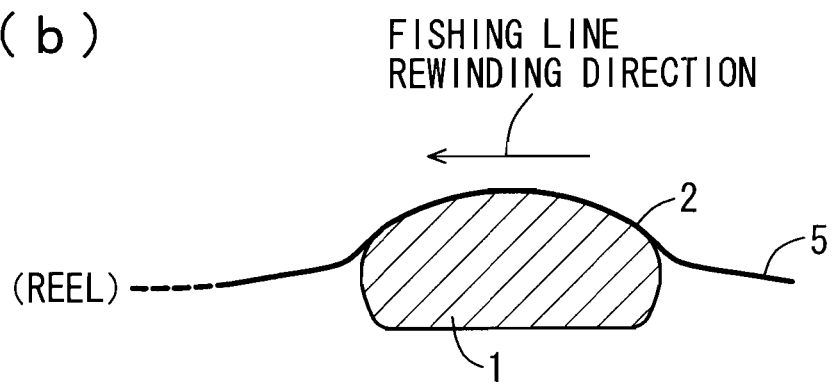

Hereinafter, the second synergistic effect of the fishing line guide member 1 will be described with reference to FIG. 4.

FIGS. 4(a) and 4(b) are cross-sectional views schematically showing the contact state between the fishing line guide member and the fishing line 5 when the fishing line 5 discharged from the reel is rewound. FIG. 4(a) shows the fishing line guide member 11 of the reference aspect, and FIG. 4(b) shows the fishing line guide member 1 of the embodiment.

Each of the fishing line guide members 1 and 11 is attached to the fishing rod (not shown) using the fishing line guide (not shown), the fishing line 5 drawn out from the reel (not shown) is inserted into the guide hole 3 of each of the fishing line guide members 1 and 11, and the fishing line is guided to the tip top while sliding along the first curve surface 2 of the inner circumferential side of the fishing line guide member. Moreover, FIGS. 4(a) and 4(b) schematically show the contact state between each of the fishing line guide members 1 and 11 and the fishing line 5 when the fishing line 5 is rewound by the reel after the fishing line 5 is temporarily discharged from the reel.

In the fishing line guide member 1, since the curvature radius R1 is larger than the curvature radius R2 in the cross-section, an inclination between the fishing line 5 and the contact end of the first curve surface is gentle, and even when the fishing line 5 is rewound after the fishing line 5 is temporarily discharged from the reel, as shown in FIG. 4(b), deformation such as the bending of the fishing line 5 on the first curve surface 2 can be suppressed. Here, in the fishing line guide member 11 of the reference aspect, the curvature radius R1 of the center side curve surface of the first curve surface 2a is smaller than the curvature radius R2 of the end side curve surface, in order words, an inclination between the fishing line 5 and the contact end of the first curve surface is steep. If the fishing line guide member 11 having the curve surface shape is used, in a so-called spinning reel, when the fishing line 5 is temporarily discharged from the reel, as shown in the B portion of FIG. 2(a), a spiral twist is generated. Thereafter, the fishing line 5 is rewound in the state where the twist is generated in the fishing line 5, the twist of the fishing line 5 is accumulated due to the steep inclination of the end of the first curve surface of the fishing line guide member 11 according to the rewinding, and as shown in a D portion of FIG. 4(a), the fishing line 5 is bent, and thus, the fishing 5 is prone to breaking. In addition, if the bending of the fishing line 5 is maintained, when the fishing line 5 is discharged from the reel again, feed resistance which is resistance against the fishing line guide member 11 is increased, and the flying distance in casting is decreased. On the other hand, in the fishing line guide member 1 of the embodiment, the following second synergistic effect can be exerted. That is, since the curvature radius R1 of the center side curve surface of the first curve surface 2 is larger than the curvature radius R2 of the end side curve surface in the cross-section, even when the fishing line 5 is rewound after the fishing line 5 is temporarily discharged from the reel, the twist is not accumulated, and as shown in FIG. 4(b), the fishing line 5 is less prone to be bent on the first curve surface 2, and therefore the fishing line 5 is less prone to breaking.

Here, the fishing line guide member 1 of the present embodiment, it is preferable that a value of R1/R2 which is a ratio of the curvature radius R1 and the curvature radius R2 is equal to or more than 3, and particularly, is within a range of 3 to 15. Within the range, particularly, the region on which the fishing line 5 can slide is increased. Accordingly, when the fishing line 5 slides on the inner circumferential surface of the fishing line guide member 1, an increase in the pressure which is applied to the fishing line 5 and is perpendicular to the inner circumferential surface of the fishing line guide member 1, can be sufficiently suppressed, and thus, the abrasion of the fishing line 5 can be more suppressed, and the fishing line 5 is less prone to breaking.

In addition, if the value of the ratio R1/R2 is within the range, particularly, the first synergistic effect and the second synergistic effect can be highly obtained.

Moreover, the curvature radii R1 and R2 are obtained by photographing arbitrary five locations in the cross-section of the fishing line guide member 1 using a commercially available metallurgical microscope or the like, by processing the photographed pictures into image data, thereafter, by measuring each of the curvature radii R1 and R2 in each cross-section using commercially available image analysis software or the like, and by calculating an arithmetic mean value of the measured values. In addition, in the measured pictures, the surface of the fishing line guide member 1 is influenced by unevenness, and thus, when a portion of the curve surface breaks off or undulation exits on the surface, a contour line of the curve surface may be corrected by approximation.

In addition, the fishing line guide member 1 of the present embodiment can be used for guiding the fishing line 5 which is formed of macromolecular compounds such as PE (a so-called braided line), nylon, or polyvinylidene fluoride (a so-called fluorocarbon line), a metal wire, or the like.

In the fishing line guide member 1 shown in FIG. 1, it is preferable that R3 is equal to or more than R2, in which the curvature radius of the second curve surface 2' is R3. It may be assumed that R3 is the curvature radius of the curve which extends from the intersections C and C' between line B-B' and the first curve surface 2 to the outer circumferential side in the cross-section of the fishing line guide member 1 shown in FIG. 1. Moreover, a preferable range in an actual dimension of R3 is dependent on the dimension of the fishing line guide member 1. However, for example, according to the dimension of the fishing line guide member generally used, when the maximum thickness T is 0.2 to 3.0 mm and the maximum width W is 0.5 to 5.0 mm, R3 may be 0.1 to 2.0 mm.

The curvature radius R3 of the second curve surface 2' is equal to or more than the curvature radius R2 of the end side curve surface of the first curve surface 2, and thus, for example, when the fishing rod is dropped or the like, even though impact is applied to the fishing line guide member 1, stress is prone to be alleviated, and occurrence of deformation and damage can be suppressed.

Particularly, it is preferable that a value of R3/R2 which is a ratio of the curvature radii R2 and R3 is equal to or more than 1.2. Within the range, higher mechanical strength of the entire fishing line guide member 1 can be obtained.

Here, the fishing line 5 is not only stretched but is also loosened during the fishing, and in this case, the first curve surface 2 and the second curve surface 2' are the regions on which the fishing line 5 and the fishing line guide member 1 come into contact with each other. Accordingly, if R3 is equal to or more than R2, a burden such as friction applied to the fishing line 5 on the first curve surface 2 and the second curve surface 2' can be alleviated.

Figure 5:
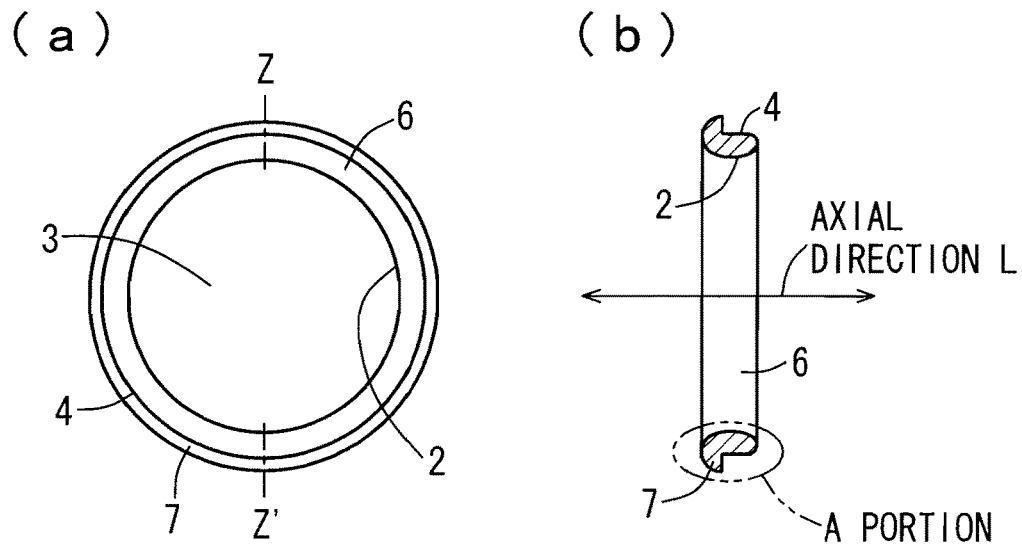

FIG. 5 shows another example of the fishing line guide member of the present embodiment, wherein FIG. 5(a) is a front view, FIG. 5(b) is a side cross-sectional view taken along the line Z-Z' shown in FIG. 5(a), and FIG. 5(c) is an enlarged view of an A portion in the side cross-sectional view of FIG. 5(b).

Particularly, when a rampaging fish is caught, in the fishing line guide member that is installed on the tip of the fishing rod, the fishing line 5 is widely moved. Accordingly, compared to the fishing line guide members installed on other portions, unexpected loads are applied in multi-directions. Therefore, it is preferable that the fishing line guide member and the holding portion of the fishing line guide holding the fishing line guide member are strongly joined to each other.

Here, in the fishing line guide member 6 shown in FIG. 5, in the cross-sectional view, a flange portion 7 is provided on the other outer circumferential side, and in the flange portion, at least a portion of the outer surface in which one end is connected to the inner circumferential side part of the curve surface becomes a curve surface 8. Accordingly, since the fishing line guide member 6 and the annular holding portion are fitted so as to be joined to each other and the joining area between the fishing line guide member 6 and the holding portion is increased, the fishing line guide member and the holding portion can be strongly joined by a bonding agent.

Particularly, the flange portion 7 includes the outer surface in which the one end is connected to the inner circumferential side part of the curve surface, at least a portion of the outer surface has a curve surface shape, and when the curvature radius of the curve surface 8 is R4, it is preferable that R4 is equal to or more than R2. In addition, FIG. 5 shows the example in which the entire outer surface having the one end connected to the inner circumferential side part of the curve surface becomes the curve surface 8. However, for example, a portion of the outer surface becomes the curve surface 8, and a portion of the outer surface may be a flat surface portion.

In the fishing line guide member 6 having the flange portion 7, if the flange portion 7 is installed to be directed toward the tip direction of the fishing rod, when the cast is performed, when the rod is lifted after a fish bites, or the like, even though the angle between the fishing line 5 and the fish rod is less than 90°, the fishing line 5 slides on the curve surface 8, and thus, the fishing line is less prone to breaking. Particularly, the curvature radius R4 of the curve surface 8 is equal to or more than the curvature radius R2 of the end side curve surface, and thus, the region on which the fishing line can slide on the curve surface 8 is increased, and the fishing line is further less prone to breaking.

In addition, in FIG. 5, the example is shown, in which the one end of the outer surface of the flange portion 7 provided on the other outer circumferential side (the lower left side in the drawing) is directly connected to the end side curve surface which is the inner circumferential side part of the curve surface. In addition, in FIG. 5(*c*), the left end side curve surface is provided onto the C portion which is positioned on the extension line of the outer circumference 4, and the portion positioned below the outer circumference 4 becomes the flange portion 7. In addition, a surface extending in a thickness direction from the other end of the outer surface becomes an inner surface 9.

Here, a thickness of the flange portion 7 can be appropriately set according to the dimension of the holding portion to which the fishing line guide member 6 is attached, or the like. However, for example, it is preferable that T2/T1 which is a ratio of the maximum thickness T2 of the fishing line guide member 6 including the flange portion 7 and the maximum thickness T1 of the fishing line guide member 6 excluding the flange portion 7 falls within a range of 1.1 to 2.5, and in this case, the preferable range in the actual dimension of the curvature radius R4 of the curve surface 8 is 0.2 to 5.0 mm.

Figure 6:
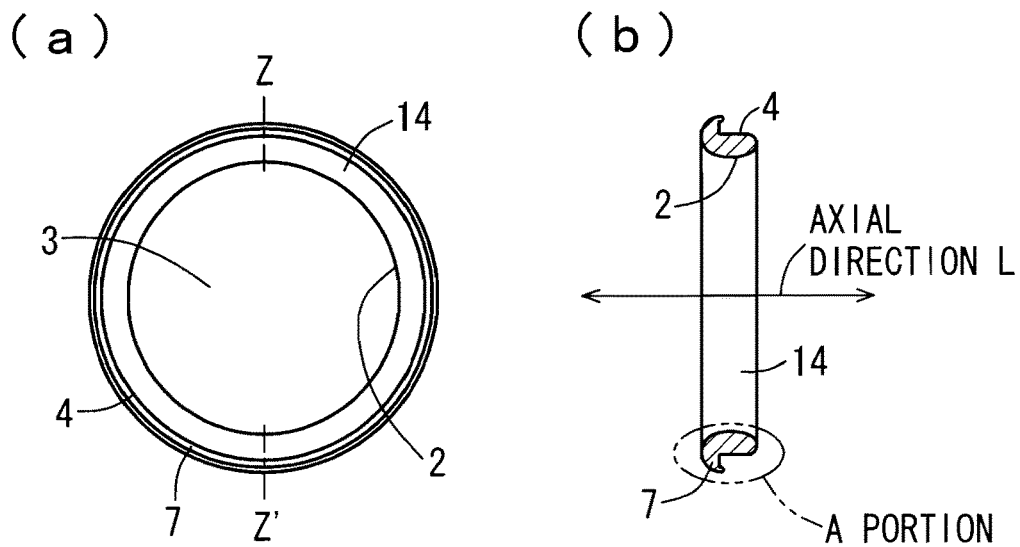
Figure 6:
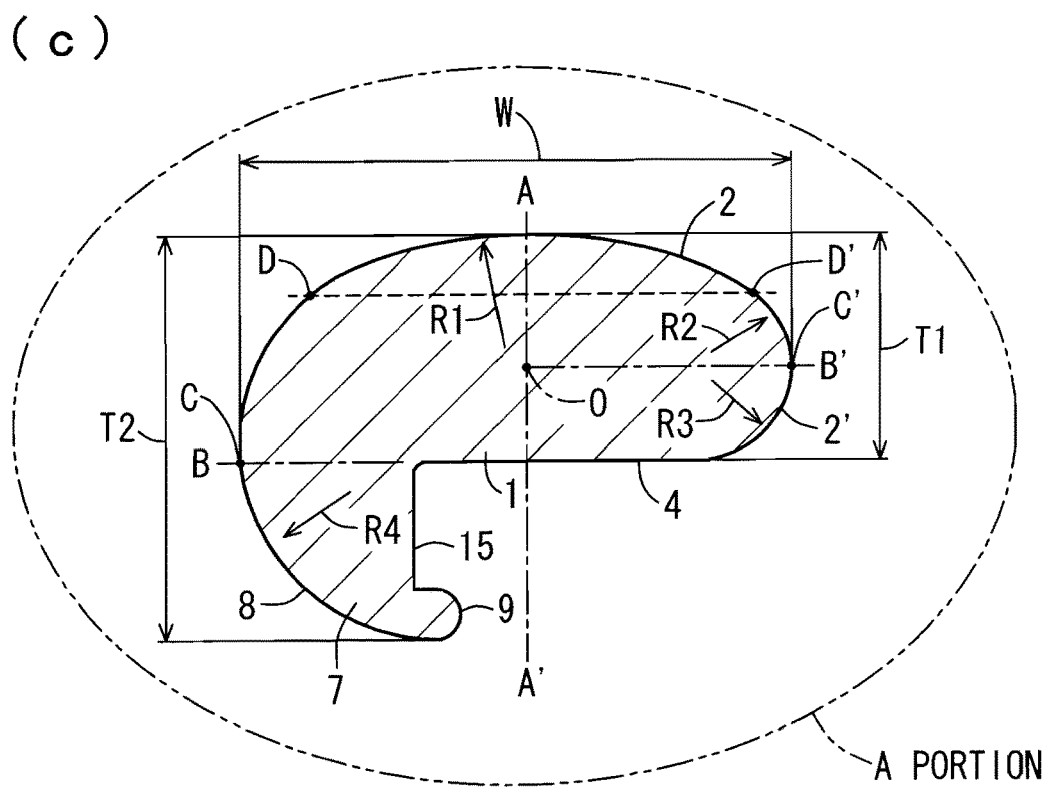

FIG. 6 shows another example of the fishing line guide member of the present embodiment, wherein FIG. 6(*a*) shows a front view, FIG. 6(*b*) is a side cross-sectional view taken along the line Z-Z' shown in FIG. 6(*a*), and FIG. 6(*c*) is an enlarged view of an A portion in the side cross-sectional view of FIG. 6(*b*).

Similar to the fishing line guide member 6 shown in FIG. 5, in a fishing line guide member 14 shown in FIG. 6, the flange portion 7 is provided in which at least a portion of the outer surface having the one end connected to the inner circumferential side part of the curve surface becomes the curve surface 8, and the flange portion 7 includes a recessed portion 15 on an inner surface 9 extending in the thickness direction from the other end of the outer surface. The recessed portion 15 functions as a bonding agent when the fishing line guide member 14 and the holding portion adhere to each other by a bonding agent, and accordingly, the fishing line guide member 14 and the holding portion can be more strongly joined to each other. Moreover, considering the strength of the flange portion 7, the dimension of the recessed portion 15 can be appropriately set. In addition, in FIG. 6, the other end side of the outer surface of the inner surface 9 has a curved convex shape. However, for example, the other end side may have a flat convex shape as long as the recessed portion 15 is formed.

Figure 7:
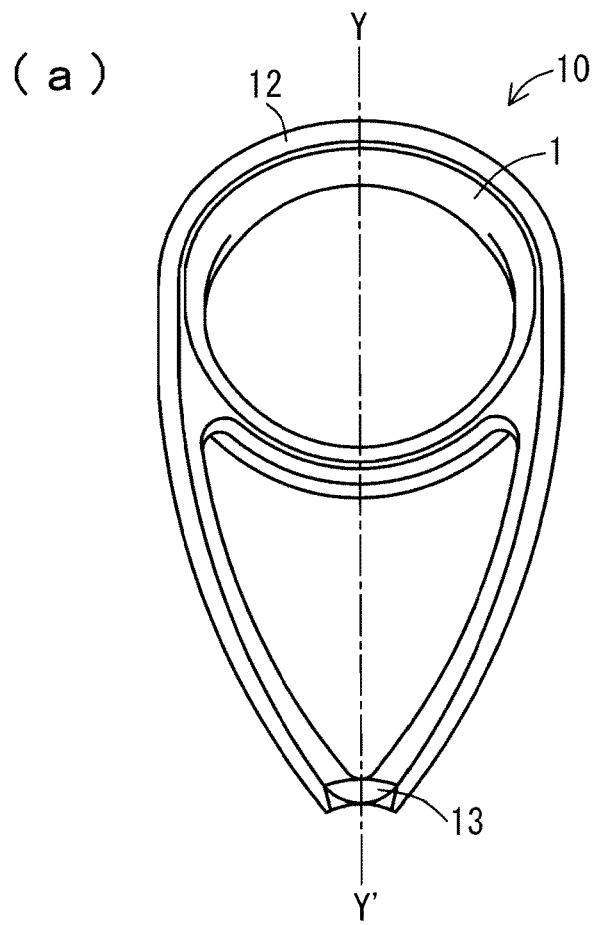
Figure 7:
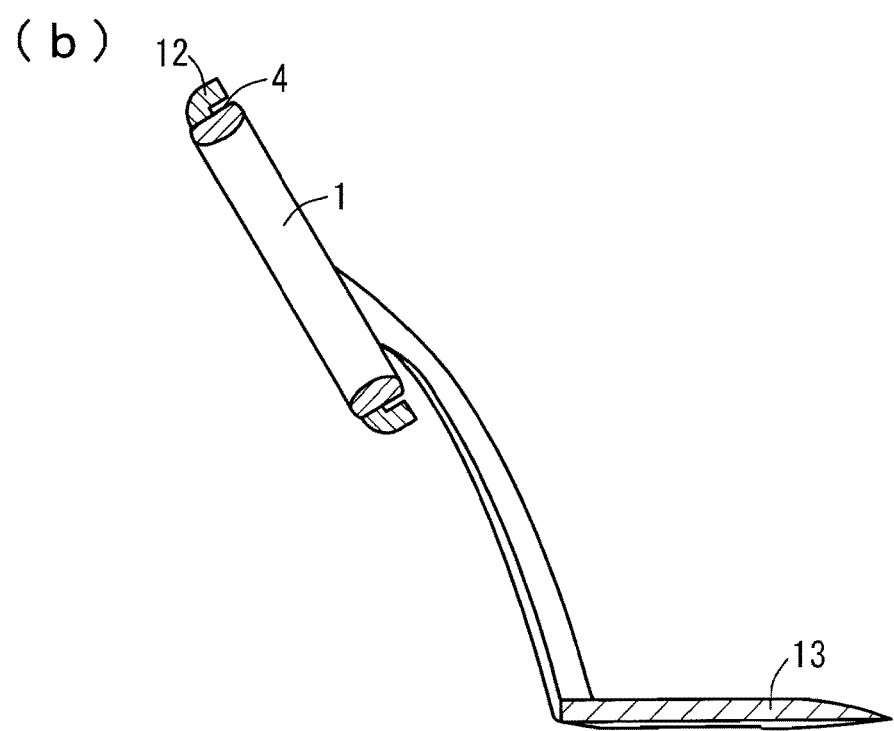

FIG. 7 is a schematic view showing an example of a fishing line guide 10 to which the fishing line guide member 1 of the present embodiment is held, wherein FIG. 7(*a*) is a front view, and FIG. 7(*b*) is a side cross-sectional view taken along the line Y-Y' shown in FIG. 7(*a*).

The fishing line guide 10 of the present embodiment shown in FIG. 7 includes an annular holding portion 12 for holding the ring shaped fishing line guide member 1 of the present embodiment, and an attachment portion 13 for attaching the fishing line guide to the fishing rod. Moreover, the holding portion 12 includes a fitting hole having a dimension by which the fishing line guide member 1 can be fitted, and the outer circumference 4 side of the fishing line guide member 1 is fitted to the fitting hole of the holding portion 12 and is held. In order to be held without moving, it is more preferable that the mutual surfaces on which the holding portion 12 and the outer circumference 4 are fitted to each other are straight line surfaces. Since the fishing line guide 10 having the above-described configuration includes the fishing line guide member 1 of the present embodiment, the fishing line is not only less prone to breaking by abrasion, but also the fishing line guide 10 can be attached to and detached from the fishing rod. In addition, the fishing line guide 10 can exert the first synergistic effect and the second synergistic effect described above.

Figure 8:
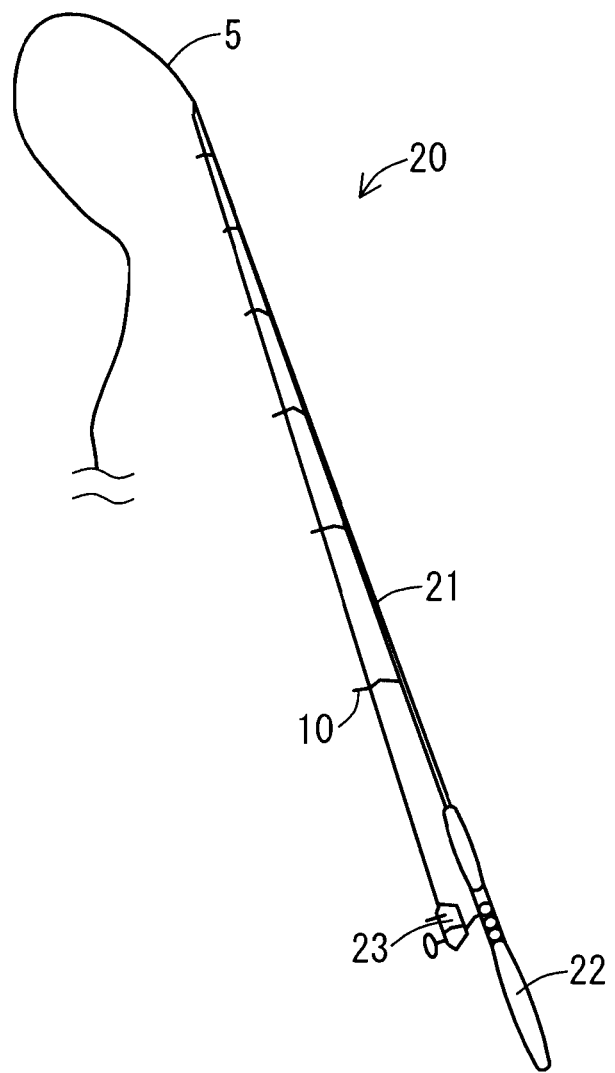
FIG. 8 is a schematic view showing an example of a fishing rod including the fishing line guide of the present embodiment.

FIG. 8 is a schematic view showing an example of a fishing rod 20 including the fishing line guide 10 of the present embodiment.

As shown in FIG. 8, in the fishing rod 20 of the present embodiment, the attachment portion 13 of each of the plurality of fishing line guides 10 is fixed to a predetermined position of a rod body 21 constituting the fishing rod 20, and the fishing line 5 which is wound on the reel 23 attached to a reel seat of the holding portion 22 is used through the guide hole 3 of the fishing line guide member 1 of the fishing line guide 10. Moreover, when the fishing rod 20 is used for fishing, a fishing rig such as a lure, a fishhook, a fishing sinker, or a float (not shown) is attached to the vicinity of the tip of the fishing line 5 drawn out from the reel, the holding portion 22 of the fishing rod 20 is grasped, the rod body 21 is swung, and thus, the fishing line 5 wound around the reel 23 can be discharged using the weight of the fishing rig. The fishing is performed using the fishing rod 20 to which the fishing line guide 10 of the present embodiment is attached, and at the time of the fishing, occurrence of the break of the fishing line 5, that is, a so-called line break is decreased, and thus, stable fishing can be performed over a long time.

Here, it is possible to appropriately select a material of the fishing line guide member 1 of the present embodiment from metal, resin, ceramics or the like according to a material of the used fishing line 5. However, from the viewpoint of a mechanical characteristic or abrasion resistance, it is preferable that ceramics is used.

In addition, it is preferable that, with respect to a color tone of the fishing line guide member 1, a lightness index L* is less than or equal to 35 in an L*a*b* color system of JIS Z 8729-1980. This is because the high-grade sensation of the fishing line guide member 1 is likely to be increased if the color tone falls within the range.

Here, the ceramics which can be applied to the material of the fishing line guide member 1 includes oxide ceramics such as alumina ($Al_2O_3$), zirconia ($ZrO_2$), or spinel ($MgAl_2O_4$), or non-oxide ceramics such as silicon carbide (SiC), silicon nitride ($Si_3N_4$), aluminum nitride (AlN), titanium nitride (TiN), or titanium carbide (TiC). Moreover, among the above-described materials, in the viewpoint of decreasing damage of the fishing line 5 as much as possible by facilitating the release of heat generated by friction between the fishing line 5 and the fishing line guide member, it is preferable that the fishing line guide member is formed of a silicon carbide sintered body or an aluminum nitride sintered body. In addition, when the maximum thickness T of the fishing line guide member 1 is thin, it is preferable that the fishing line guide member is formed of a silicon nitride sintered body having mechanical characteristics such as excellent mechanical strength, abrasion resistance, or toughness.

In addition, the silicon nitride sintered body used for the fishing line guide member 1 of the present embodiment is not particularly limited. However, it is more preferable that the fishing line guide member is configured so that yttrium (Y) of 3 mass % or more and 12 mass % or less in terms of $Y_2O_3$, aluminum (Al) of 2 mass % or more and 5 mass % or less in terms of $Al_2O_3$, silicon (Si) of 2 mass % or more and 4 mass % or less in terms of $SiO_2$, and the remainder of silicon nitride are contained, and thus, densification can be achieved, and the fishing line guide member has high mechanical characteristics.

Moreover, when the fishing line guide member 1 of the present embodiment is formed of the silicon nitride sintered body, it is preferable that apparent density is equal to or more than 3.27 $g/cm^3$. When the apparent density is equal to or more than 3.27 $g/cm^3$, a densified silicon nitride sintered body is achieved, and thus, crystals of the silicon nitride are less prone to be separated by abrasion, and the abrasion resistance against the fishing line 5 of the fishing line guide member 1 is further increased. In addition, it is preferable that an average crystal grain size of the silicon nitride sintered body is less than or equal to 0.8 μm.

Moreover, the apparent density may be measured based on JIS R 1634-1998. In addition, the average crystal grain size may be calculated by a planimetric method. The calculation method may be performed by mirror-grinding the silicon nitride sintered body, thereafter, by ultrasonic-cleaning or etching the ground surface, by observing at 5000-fold magnification, for example, using a SEM (Scanning Electron Microscope), and by calculating the image observed at this time by the planimetric method. Moreover, in the planimetric method, in the observed image in which the imaging magnification is m times, an already known circle having an area (A) is drawn, the number of particles $N_G$ per a unit region is obtained by the following expression (1) from the number of particles $n_c$ within the circle and the number of particles $n_i$ positioned at the perimeter, an equivalent circle diameter (D) is calculated using the following expression (2), and the equivalent circle diameter becomes the average grain size.

$$N_G = (n_c + \tfrac{1}{2} n_i)/(A/m^2) \quad (1)$$

$$D = 2/(\pi N_G)^{1/2} \quad (2)$$

In addition, when the fishing line guide member 1 of the present embodiment is formed of a silicon nitride sintered body, it is preferable, in an arbitrary cross-section of the fishing line guide member 1, the number of the crystal grains of the silicon nitride of 1 μm or more in the equivalent circle diameter per a unit region of 10 μm×10 μm in vertical and horizontal dimensions is less than or equal to 20 (excluding 0). This is based on the knowledge that abrasion resistance can be improved if the number of the crystal grains of silicon carbide of 1 μm or more in the equivalent circle diameter per the unit region of 10 μm×10 μm is less than or equal to 20. In addition, in the present embodiment, it is assumed that the arbitrary cross-section of the fishing line guide member 1 indicates the surface quality of the region on which the fishing line 5 can slide.

Moreover, it is preferable that the lower limit in the number of crystal grains of the silicon nitride of 1 μm or more in the equivalent circle diameter per the unit region of 10 μm×10 μm is 5. Although the reason is also not clear, it is considered that the number of crystal grains of the silicon nitride which are equal to or more than 1 μm in the equivalent circle diameter and exist in the silicon nitride sintered body influences compression stress applied to the crystal of the silicon nitride which is a main phase. Moreover, it is preferable that the number of crystal grains of the silicon carbide of 1 μm or more in the equivalent circle diameter per the unit region of 10 μm×10 μm is 6 to 16. In addition, it is more preferable that the number of crystal grains of the silicon carbide of 1 μm or more in the equivalent circle diameter per the unit region of 10 μm×10 μm is 8 to 14.

Here, the number of crystal grains of the silicon carbide of 1 μm or more in the equivalent circle diameter per the unit region of 10 μm×10 μm may be obtained as follows. An arbitrary cross-section of the silicon nitride sintered body is mirror-ground, thereafter, the ground surface is ultrasonic-cleaned or etched, and based on an image obtained by photographing at a predetermined magnification by a SEM (Scanning Electron Microscope) or a metallurgical microscope, a circle having 1 μm in diameter is set to a reference circle, the reference circle and the crystal grain of the silicon carbide in the unit region of 10 μm×10 μm are compared with each other, and the number of the crystal grains equal to or greater than the size (area) of the reference circle is counted. Moreover, the number of crystal grains may be calculated using image analysis software.

Moreover, when the fishing line guide member 1 is formed of ceramics, preferably, a void rate is less than or equal to 1.8%. When the void rate is less than or equal to 1.8%, the mechanical strength is increased, and the abrasion resistance of the fishing line guide member 1 with respect to the fishing line 5 can be improved. Moreover, here, the void rate means a value which is obtained by mirror-grinding an arbitrary cross-section of the fishing line guide member 1, thereafter, by observing the surface by a SEM (Scanning Electron Microscope) or a metallurgical microscope, and by representing a void total area in the measured area by an area ratio through the image analysis.

Moreover, when the fishing line guide member 1 of the present embodiment is formed of the silicon nitride sintered body, it is more preferable that the void rate is 0.3% to 1.5%. When the void rate falls within the range, excellent mechanical strength can be provided, water held in the voids during the fishing plays a role of lubricant between the surface of the fishing line 5 and the surface of the fishing line guide member 1, and thus, a friction coefficient is decreased, and the abrasion resistance can be improved. In addition, when the void rate is less than 0.3%, the amount of the water held in the voids is decreased, and thus, the effect on the improvement of the abrasion resistance is decreased, and when the void rate exceeds 1.5%, the mechanical strength is likely to be decreased.

In addition, when the fishing line guide member 1 of the present embodiment is formed of the silicon nitride sintered body, it is preferable that melilite ($Y_2Si_3O_3N_4$: yttrium nitride silicate) crystal is provided on a grain boundary (here, between crystals of the silicon nitride). In addition, whether or not melilite crystals exist between the crystals of the silicon nitride or on the grain boundary can be confirmed using an X-ray diffractometer. For example, whether or not melilite crystals exist can be confirmed by radiating CuKα rays on the surface of the silicon nitride sintered body using the X-ray diffractometer (D8 ADVANCE manufactured by Bruker AXS corporation), obtaining an X-ray diffraction chart which is a result obtained by scanning an angle difference (2θ) between a diffraction direction of the CuKα ray and the incident direction and intensity of the diffraction X-rays by a detector, and identifying the X-ray diffraction chart based on the JCPDS (Joint Committee on Power Diffraction Standards) card.

When the melilite crystals exist on the grain boundary, peak intensity of the melilite ($Y_2Si_3O_3N_4$: yttrium nitride silicate) crystal in which 2θ=37.2° in the X-ray diffraction chart is satisfied is defined as $I_M$, and peak intensity of the silicon nitride crystal in which 2θ=27.0° is satisfied is defined as $I_S$, it is preferable that a value of $I_M/I_S$ is less than or equal to 0.1. When the value of $I_M/I_S$ is less than or equal to 0.1, good abrasion resistance is provided, and the fishing line guide member having high strength can be obtained. When the value of $I_M/I_S$ exceeds 0.1, higher strength (radial crushing strength) is less prone to be obtained, and when the value of $I_M/I_S$ is 0 and the melilite crystals do not exist on the grain boundary, the grains of the silicon nitride crystals are prone to be grown, the grain size is entirely increased, and thus, better abrasion resistance is less prone to be obtained.

Here, the abrasion resistance of the fishing line guide member 1 with respect to the fishing line 5 can be evaluated using an abrasion resistance evaluation device having the configuration described below.

Figure 9:
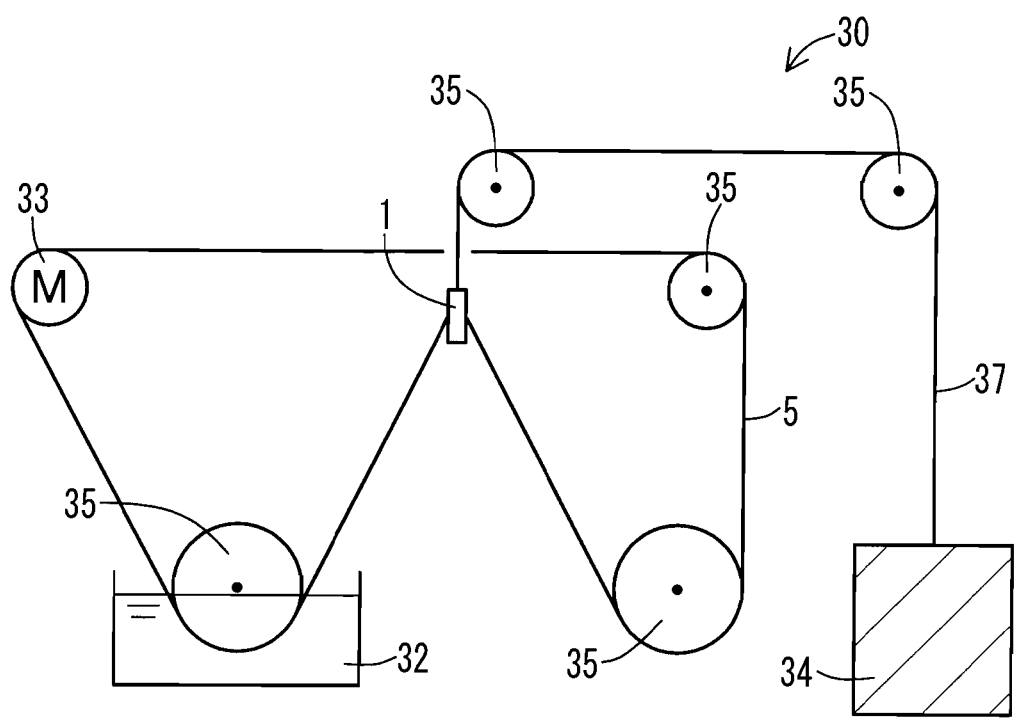
FIG. 9 is a schematic view showing an example of a configuration of an abrasion resistance evaluation device which is used in the evaluation of the abrasion resistance of the fishing line guide member with respect to the fishing line.

FIG. 9 is a schematic view showing an example of a configuration of an abrasion resistance evaluation device 30 which is used in the evaluation of the abrasion resistance of the fishing line guide member 1 with respect to the fishing line 5. The abrasion resistance evaluation device 30 includes the fishing line 5, pulleys 35 which applies tension to the fishing line 5 at a predetermined position, a motor 33 which travels the fishing line 5, and a water tank 32 which attaches muddy water to the fishing line 5. In addition, a load of the mass of a weight 34 is vertically upward applied to the ring shaped fishing line guide member 1, which is fixed by a jig (not shown) or the like at a predetermined position, via a wire 37, and the fishing line 5, to which the muddy water is attached through the water tank 32, slides on the lower side inner circumferential surface of the fishing line guide member 1. In addition, using the abrasion resistance evaluation device 30, the fishing line 5 slides during a constant time in a state where the fishing line 5 comes into contact with the inner circumferential surface of the fishing line guide member 1, a depth of an abrasion mark (hereinafter, simply referred to as an abrasion depth) in which the abrasion amount of the fishing line guide member 1 after the sliding can be confirmed by the abrasion is measured, and thus, the abrasion resistance of the fishing line guide member 1 with respect to the fishing line 5 can be evaluated.

Moreover, the radial crushing strength of the fishing line guide member 1 can be evaluated by a radial crushing strength test described below.

Figure 10:
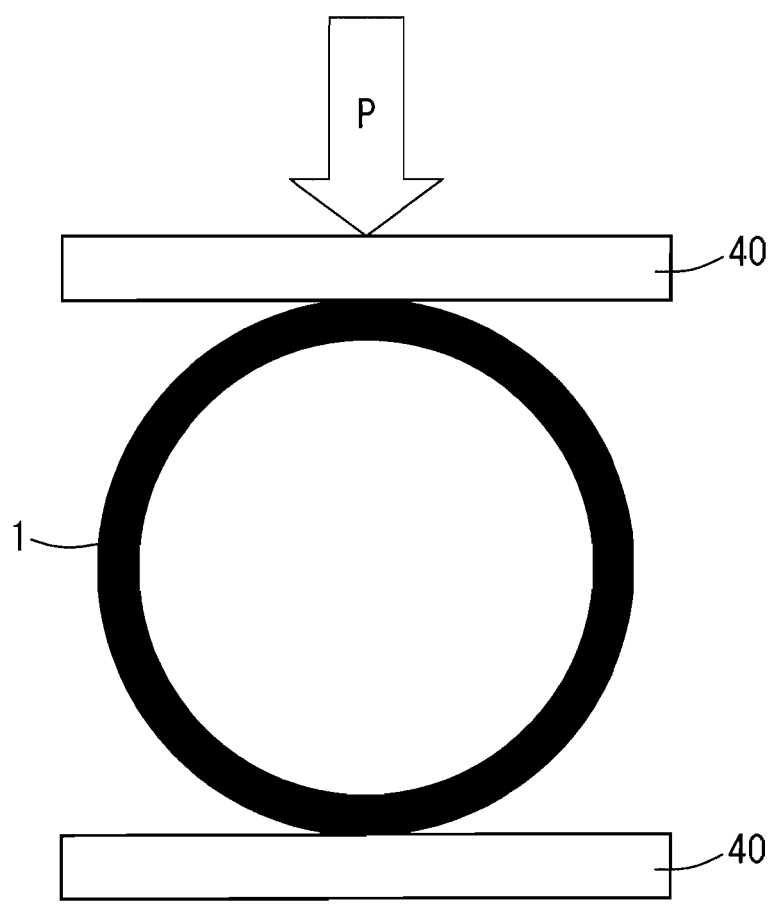
FIG. 10 is a schematic view for explaining the radial crushing strength test method of the fishing line guide member.

The radial crushing strength can be measured according to a method based on a radial crushing strength test method of JIS Z 2507: 2000. FIG. 10 is a schematic view for explaining the radial crushing strength test method of the fishing line guide member. As shown in FIG. 10, a test object (fishing line guide member 1) is fixed to be interposed between a pair of upper and lower fixing jigs (ceramic jig 40), a radial load is applied to the test object from the above, and the radial crushing strength is obtained by measuring the maximum load p when the test object is fractured. According to this test method, when the maximum load when the test object is fractured is defined as p (unit: kgf), the value of the outer diameter of the fishing line guide member 1 is defined as d (unit: mm), the value of the thickness T is defined as t (unit: mm), and the value of the width W is defined as w (unit: mm), the radial crushing strength (σr) (unit: MPa) of the test object can be obtained by the following expression: σr=(p (d−t)/(w×t²))×9.8.

In addition, when the fishing line guide member 1 of the present embodiment is formed of the silicon nitride sintered body, it is preferable that at least one crystal of $Y_2SiAlO_5N$, $Y_4SiAlO_8N$, $Y_2SiO_5$, and $\alpha\text{-}Y_2Si_2O_7$ is provided on a grain boundary (here, between crystals of the silicon carbide). Moreover, similar to the above, whether or not crystals of $Y_2SiAlO_5N$, $Y_4SiAlO_8N$, $Y_2SiO_5$, and $\alpha\text{-}Y_2Si_2O_7$ exist on the grain boundary can be confirmed using the X-ray diffractometer.

When at least one crystal of $Y_2SiAlO_5N$, $Y_4SiAlO_8N$, $Y_2SiO_5$, and $\alpha\text{-}Y_2Si_2O_7$ exists on a grain boundary, the strength of the silicon nitride sintered body can be improved, and excellent mechanical strength and fracture toughness can be provided. Although the reason is not clear, it is considered because when at least one crystal of $Y_2SiAlO_5N$, $Y_4SiAlO_8N$, $Y_2SiO_5$, and $\alpha\text{-}Y_2Si_2O_7$ exists on a grain boundary, a fine texture structure can be obtained by controlling the grain growth of the crystal of the silicon nitride which is a main phase, and the stress applied to the grain boundary phase is distributed. Moreover, the fishing line guide member 1, which is formed of the silicon nitride sintered body having at least one crystal of $Y_2SiAlO_5N$, $Y_4SiAlO_8N$, $Y_2SiO_5$, and $\alpha\text{-}Y_2Si_2O_7$ existing on a grain boundary, has excellent mechanical strength and fracture toughness, and high radial crushing strength.

Figure 11:
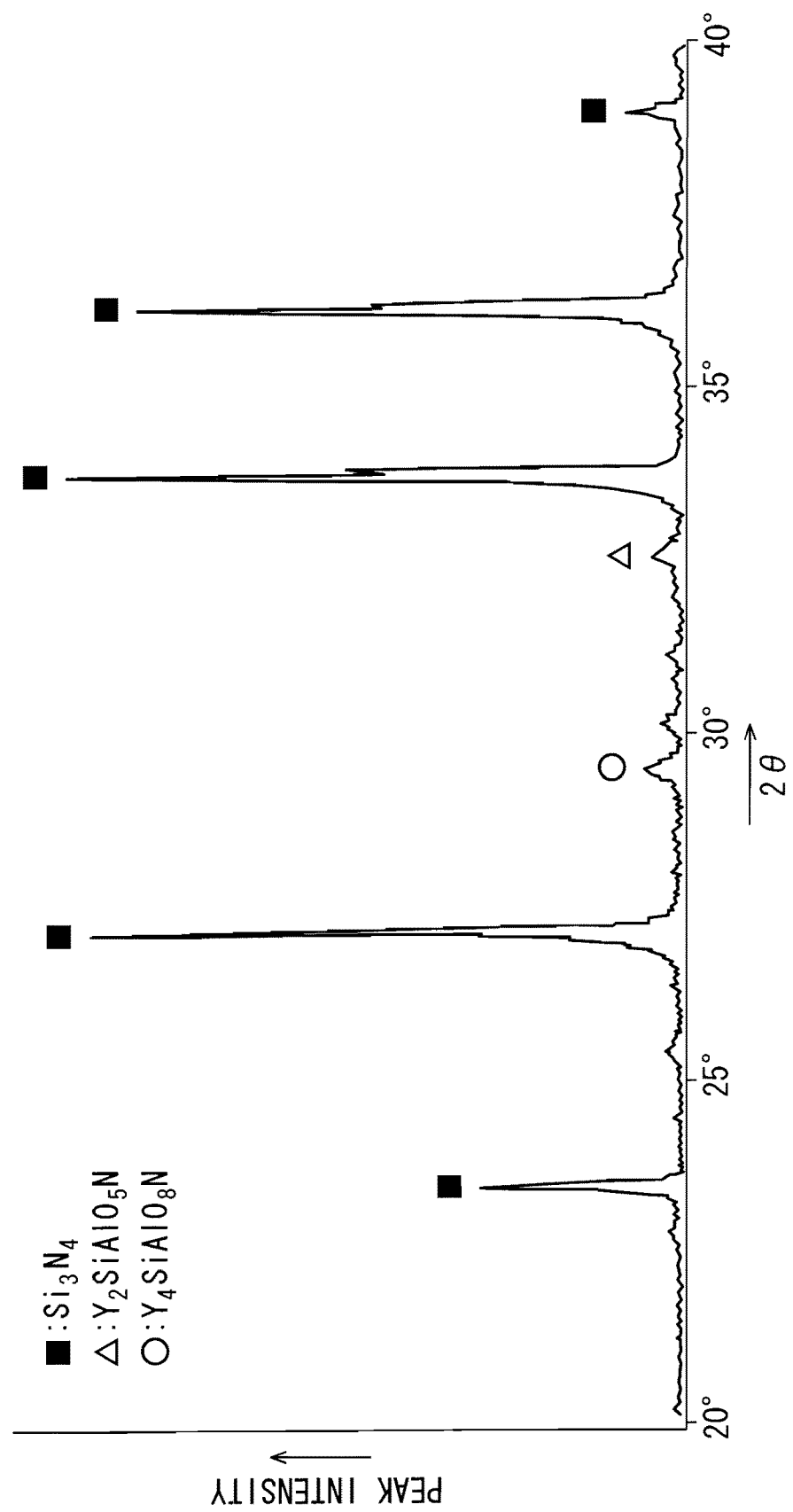
FIG. 11 is an X-ray diffraction chart showing an example of the fishing line guide member of the present embodiment formed of the silicon nitride sintered body.

FIG. 11 is an X-ray diffraction chart showing an example of the fishing line guide member of the present embodiment formed of the silicon nitride sintered body. In the X-ray diffraction chart, peaks indicating that crystals of the silicon nitride exist are represented in the vicinity of 2θ=23.5°, in the vicinity of 27.2°, in the vicinity of 33.6, and in the vicinity of 36°. Moreover, since the peak indicating that the crystals of $Y_2SiAlO_5N$ exist is represented in 2θ=32° to 33° (for example, 32.6°) and the peak indicating that the crystals of $Y_4SiAlO_8N$ exist is represented in 2θ=29° to 31° (for example, 29.4°, 30.7°, and 31.1°), existence of the crystals of $Y_2SiAlO_5N$ and $Y_4SiAlO_8N$ can be confirmed by each peak. Moreover, a broad peak between peaks indicating the existence of the silicon nitride, $Y_2SiAlO_5N$ and $Y_4SiAlO_8N$ indicates that noncrystalline (amorphous) phase exists on the silicon nitride sintered body.

Moreover, in the fishing line guide member 1 of the present embodiment, when the value of the peak intensity in the crystals of $Y_2SiAlO_5N$ in the vicinity of $2\theta=32.6°$ in the X-ray diffraction chart of the surface of the silicon nitride sintered body is defined as X, the value of the peak intensity in the X-ray diffraction of the crystals of $Y_4SiAlO_8N$ in the vicinity of $2\theta=29.4°$ is defined as Y, if the ratio X/Y is less than or equal to 1.2 (excluding 0), the mechanical strength and the fracture toughness are likely to be further increased, and thus, the radial crushing strength of the fishing line guide member 1 is likely to be further increased.

Figure 12:
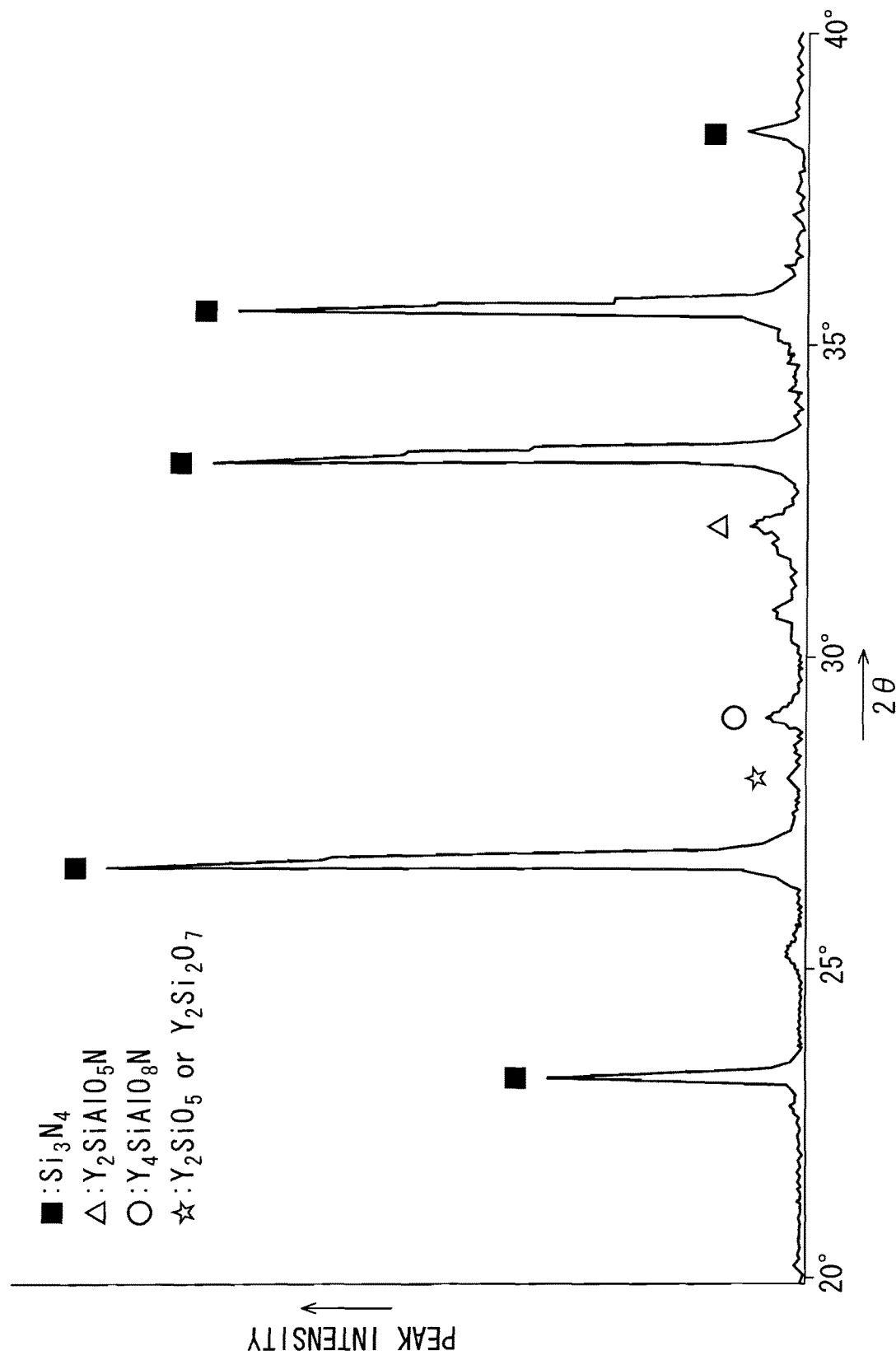
FIG. 12 is an X-ray diffraction chart showing another example of the fishing line guide member of the present embodiment formed of the silicon nitride sintered body.

FIG. 12 is an X-ray diffraction chart showing another example of the fishing line guide member of the present embodiment formed of the silicon nitride sintered body. In this X-ray diffraction chart, similar to the example shown in FIG. 11, in addition to peaks indicating that each crystal of the silicon nitride, $Y_2SiAlO_5N$, and $Y_4SiAlO_8N$ exist, the peak indicating the existence of the crystal of $Y_2SiO_5$ or $\alpha$-$Y_2Si_2O_7$ is represented in $2\theta=28°$ to $29°$ (for example, 28.3°), and in the example shown in FIG. 12, the existence of the crystal can be confirmed.

Next, as an example of a manufacturing method of the present embodiment, a case where the silicon nitride sintered body is applied to the material of the fishing line guide member 1 will be described.

First, as a starting material, Si powder (the average particle size $D_{50}=0.5$ to 100 μm) and $Si_3N_4$ powder (the $\alpha$ transformation rate is equal to or more than 50% and the average particle size $D_{50}=0.5$ to 10 μm) are prepared, and as a sintering assistant, $Y_2O_3$ powder (the average particle size $D_{50}=0.5$ to 10 μm), $Al_2O_3$ powder (the average particle size $D_{50}=0.5$ to 10 μm), and $SiO_2$ powder (the average particle size $D_{50}=0.5$ to 10 μm) are prepared. Thereafter, each powder is weighed by a predetermined amount, enters a mill such as a rotation mill, a vibration mill, and a bead mill along with various binders such as polyvinyl alcohol (PVA) or polyethylene glycol (PEG) and a solvent, is wet-blend and crushed, and thus, slurry is produced.

Moreover, a mass ratio of the Si powder and the $Si_3N_4$ powder is weighed so that Si powder/$Si_3N_4$ powder 1 is satisfied. In addition, in order to make a composition of the silicon nitride sintered body so that yttrium (Y) of 3 mass % or more and 12 mass % or less in terms of $Y_2O_3$, aluminum (Al) of 2 mass % or more and 5 mass % or less in terms of $Al_2O_3$, and silicon (Si) of 2 mass % or more and 4 mass % or less in terms of $SiO_2$, and the remainder of silicon nitride are contained, when the mass ratio of the Si powder and $Si_3N_4$ powder is 85:15, the $Y_2O_3$ powder and the $Al_2O_3$ powder are weighed to be 4.3 mass % or more and 17 mass % or less, and to be 2.9 mass % or more and 7.2 mass % or less, respectively. Moreover, the reason why the mass % at the time of weighing of each powder and the mass % in the content of the silicon nitride sintered body are different from each other is because the Si powder is nitrified and becomes the silicon nitride. Moreover, the example in which the cheap Si powder is applied is described above. However, the silicon nitride sintered body in which only the $Si_3N_4$ powder is produced as a primary material can be applied.

Moreover, the $SiO_2$ powder is weighed so that the $SiO_2$ powder and the amount in which oxygen is inevitably included in the Si powder and the $Si_3N_4$ powder in terms of $SiO_2$ are added and the content included in the silicon nitride sintered body in terms of $SiO_2$ is 2 mass % or more and 4 mass % or less. Moreover, it is preferable that the content of the silicon nitride sintered body of $Y_2O_3$:$Al_2O_3$:$SiO_2$ is 50 to 66 mass %:18 to 26 mass %:16 to 24 mass % by the mass ratio.

Next, after spherical granules are obtained by spray-granulating the slurry using a spray granulation dryer (spray dryer), the spherical granules are molded by a power press molding method, and a molded body is obtained by performing cutting as necessary.

Next, silicon (Si powder) is nitrified to the molded body by firing the molded body at 1000 to 1400° C. under a nitrogen partial pressure of 50 kPa to 1.1 MPa, and after the $\alpha$ transformation rate of the silicon nitride in the molded body is set to be equal to or more than 90%, the molded body is fired at the maximum temperature of 1700 to 1900° C. under the nitrogen partial pressure of 50 to 300 kPa. In addition, in order to cause the crystals of melilite ($Y_2Si_3O_3N_4$), $Y_2SiAlO_5N$, and $Y_4SiAlO_8N$ to exist on the grain boundary, a temperature drop rate from the maximum temperature to 1200° C. may be less than or equal to 10° C./min. In addition, when the peak intensity in the crystal of the melilite ($Y_2Si_3O_3N_4$: yttrium nitride silicate) of $2\theta=37.2°$ is defined as $I_M$ and the peak intensity of the silicon nitride crystal of $2\theta=27.0°$ is defined as $I_S$ in the X-ray diffraction chart, in order to cause the value of $I_M/I_S$ to be less than or equal to 0.1 (excluding 0), the temperature drop rate from the maximum temperature to 1200° C. may be 5° C./min or more and 10° C./min or less. In addition, when the peak intensity of the crystal of $Y_2SiAlO_5N$ in the vicinity of $2\theta=32.6°$ is defined as X and the peak intensity in the X-ray diffraction of the crystal of $Y_4SiAlO_8N$ in the vicinity of $2\theta=29.4°$ is defined as Y in the X-ray diffraction chart, in order to cause the ratio X/Y to be less than or equal to 1.2, the temperature drop rate may be 7° C./min or more and 10° C./min or less. Moreover, in order to cause the crystal ($Y_2SiO_5$ or $\alpha$-$Y_2Si_2O_7$) indicating the peak between $2\theta=28°$ to $29°$ to exist in the X-ray diffraction chart, the firing is performed at a relatively low temperature in which the maximum temperature during the firing may be within a range of 1700 to 1800° C.

Moreover, in the color tone, in order to cause the lightness index L* in L*a*b*color system of JIS Z 8729-1980 to be less than or equal to 35, a coloring agent formed of a predetermined amount of transition metal may be added to the starting material. In this way, if the coloring agent formed of the transition metal is added to the starting material, silicate of the transition metal exists on the grain boundary of the silicon nitride sintered body, and the lightness index L* can be less than or equal to 35. In addition, as the added transition metal, it is preferable that steel or tungsten, which is prone to form silicate thereof on the grain boundary during the firing, is used.

Moreover, in order to cause the apparent density to be equal to or more than 3.27 g/cm$^3$, the maximum temperature during the firing may be equal to or more than 1700° C.

Moreover, in order to cause the average crystal grain size of the silicon nitride to be less than or equal to 0.8 μm, the silicon nitride sintered body may be manufactured by a reactive sintering process using Si powder and $Si_3N_4$ powder as the starting material.

In addition, in order to cause the number of the crystal grains of the silicon nitride of 1 μm or more in the equivalent circle diameter per the unit region of 10 μm×10 μm to be less than or equal to 20 (excluding 0), the maximum temperature during the firing may be set to 1710 to 1750° C. which is a relatively low temperature.

Moreover, the maximum temperature during the firing is equal to or more than 1710° C., and thus, the void rate can be less than or equal to 1.8%, and particularly, a holding time of the maximum temperature during the firing is set to fall within a range of 3 to 20 hours, the void rate can be a range of 0.3% or more and 1.5% or less. In addition, in order to decrease the void rate, hot isostatic press forming (HIP) processing after the firing may be performed.

Moreover, after the silicon nitride sintered body is cooled to room temperature, a curve surface is formed by barrel machining or grinding machining, finally, the centerless machining is performed, and thus, the fishing line guide member 1 of the present embodiment formed of the silicon nitride sintered body can be obtained.

In addition, the manufacturing method in which the fishing line guide member 1 of the present embodiment is formed of the silicon nitride sintered body is described in detail. In addition to this, the fishing line guide member can be manufactured from ceramics such as alumina ($Al_2O_3$), zirconia ($ZrO_2$), spinel ($MgAl_2O_4$), silicon carbide (SiC), aluminum nitride (AlN), titanium nitride (TiN), and titanium carbide (TiC), or from metal such as stainless steel or titanium.

EXAMPLE 1

Hereinafter, Examples of the invention are described. However, the invention is not limited to the following Examples.

As the starting material, Si powder (the average particle size $D_{50}$=10 μm) and $Si_3N_4$ powder (the α transformation rate is 70% and the average particle size $D_{50}$=1 μm) were prepared, and as the sintering assistant, $Y_2O_3$ powder (the average particle size $D_{50}$=1 μm), $Al_2O_3$ powder (the average particle size $D_{50}$=1 μm), and $SiO_2$ powder (the average particle size $D_{50}$=1 μm) were prepared. Continuously, in each powder, the Si powder was weighed to 65 mass %, the $Si_3N_4$ powder was weighed to 15 mass %, the $Y_2O_3$ powder was weighed to 12 mass %, the $Al_2O_3$ powder was weighed to 5 mass %, and the $SiO_2$ powder was weighed to 3 mass %.

Moreover, the weighed powder, polyvinyl alcohol (PVA), and solvent enters a rotation mill and were mixed and crushed for a predetermined time, and thus, slurry was manufactured. In addition, after the slurry was spray-granulated using a spray granulation dryer and spherical granules were obtained, and thus, a molded body was obtained from the spherical granulates by a powder press molding method. Next, after the molded body was fired at the temperature of 1300° C. under the nitrogen partial pressure of 120 kPa and a nitride body in which the α transformation rate of the silicon nitride is equal to or more than 90% was obtained, the molded body was held for 5 hours at the maximum temperature shown in Table 1 under the nitrogen partial pressure of 120 kPa, and thus, sample Nos. 1 to 10 were obtained, in which the number of the crystal grains of the silicon nitride of 1 μm or more in the equivalent circle diameter per the unit region of 10 μm×10 μm was different from one another. Here, in shapes of all of the sample Nos. 1 to 10, the outer diameters were 12 mm, the inner diameters were 10 mm, and the widths (W) were 2 mm, and in the cross-sectional views, as the fishing line guide member 1 shown in FIG. 2, the curvature radii R1 were 4.5 mm, and the curvature radii R2 were 0.8 mm.

Moreover, with respect to sample Nos. 1 to 10, the abrasion resistance was evaluated with respect to the fishing lines of the fishing line guide members using the above-described abrasion resistance evaluation device 30, and the results were shown as the abrasion depths in Table 1.

In addition, in the set condition of the abrasion resistance evaluation device 30, the mass of the weight 34 was set to 500 g, the speed on which the line 5 slides on the inner circumferential surface of the sample was set to 60 m/min, and the traveling distance of the line 5 was set to 3000 m.

Moreover, after an arbitrary cross-section of the sample was mirror-ground, the ground surface was ultrasonic-cleaned, and an observed image enlarged at 5000-fold magnification was obtained using SEM (Scanning Electron Microscope). In addition, the observed image was converted to image data, a circular particle analysis method was applied to the image data using image analysis software "A-ZO KUN" (registered trademark and manufactured by Asahi Kasei Engineering Corporation), the number of crystal grains and each area of every grain within a range of 10 μm×10 μm in the image data were obtained, the number of the crystal grains exceeding the area of the circle of 1 μm in diameter drawn at the scale in the image data was calculated, and the number of the crystal grains of the silicon nitride of 1 μm or more in the equivalent circle diameter was obtained. The results are shown in Table 1.

In addition, the average crystal grain sizes of the sample Nos. 1 to 10 were calculated by a planimetric method using the observed image, and average crystal grain sizes of all of the sample Nos. 1 to 10 were less than or equal to 0.8 μm. In addition, the apparent densities of the samples Nos. 1 to 10 were measured based on JIS R 1634-1998, and apparent densities of all of the sample Nos. 1 to 10 were equal to more than 3.27 g/cm³. Moreover, in the cross-sections of the sample No. 1 to 10, the areas of the voids occupying the region of 100 μm×100 μm were measured from the observed images which were enlarged at 500-fold magnification using SEM (Scanning Electron Microscope), the void rates were calculated, and void rates of all of the samples 1 to 10 were less than or equal to 1.8%.

TABLE 1

| Sample No. | Number of Crystal Grains of Silicon Nitride of 1 μm or more in Equivalent Circle Diameter (Number/(10 μm × 10 μm)) | Abrasion Depth (μm) | Maximum Temperature during Firing (° C.) |
|---|---|---|---|
| 1 | 24 | 1.7 | 1800 |
| 2 | 21 | 1.7 | 1755 |
| 3 | 20 | 1.4 | 1750 |
| 4 | 16 | 1.3 | 1745 |
| 5 | 14 | 1.2 | 1740 |
| 6 | 12 | 1.2 | 1735 |
| 7 | 8 | 1.2 | 1730 |
| 8 | 6 | 1.3 | 1725 |
| 9 | 5 | 1.4 | 1720 |
| 10 | 1 | 1.6 | 1710 |

As shown in Table 1, in each of the sample Nos. 3 to 10 in which the number of the crystal grains of the silicon nitride of 1 μm or more in the equivalent circle diameter per the unit region of 10 μm×10 μm was less than or equal to 20, the abrasion depth was less than or equal to 1.6 μm, and compared to the samples No. 1 and 2 out of the range, the abrasion depth was shallow, and thus, it was understood that the abrasion resistance against the fishing line was excellent. Moreover, in the sample Nos. 3 to 10, with respect to the samples Nos. 3 to 9, the abrasion depth was less than or equal to 1.4 μm, the number of the crystal grains of the silicon nitride equal to more than 1 μm in the equivalent circle diameter was 5 to 20, and thus, the abrasion resistance against the fishing line was prone to be increased. In addition, with respect to the sample Nos. 4 to 8, the abrasion depth was less than or equal to 1.3 μm, the number of the crystal grains of the silicon nitride of 1 μm or more in the equivalent circle diameter per the unit region of 10 μm×10 μm is 6 to 16, and the abrasion resistance against the fishing line was particularly prone to be increased.

EXAMPLE 2

Next, except for various changes of the holding time of the maximum temperature during firing as shown in Table 2, sample Nos. 11 to 17 were manufactured using the method similar to the sample No. 5 of Example 1. Similar to Example 1, each sample was prepared in which the outer diameter was 12 mm, the inner diameter was 10 mm, and the width (W) was 2 mm, and in the cross-sectional view, as the fishing line guide member 1, the curvature radius R1 was 4.5 mm, and the curvature radius R2 was 0.8 mm. In addition, the void rate of each sample was measured using the method similar to Example 1, the abrasion resistance test similar to Example 1 was performed, and the abrasion depth and the radial crushing strength of each sample were obtained by performing the above-described radial crushing strength test. The results are shown in Table 2.

TABLE 2

| Sample No. | Holding Time of Maximum Temperature] (Hour) | Void Rate (%) | Abrasion Depth (μm) | Radial Crushing Strength (MPa) |
| --- | --- | --- | --- | --- |
| 11 | 25 | 0.2 | 1.4 | 1020 |
| 12 | 20 | 0.3 | 1.2 | 990 |
| 13 | 15 | 0.5 | 1.1 | 950 |
| 14 | 8 | 1.0 | 1.0 | 820 |
| 15 | 3 | 1.5 | 1.2 | 700 |
| 16 | 2 | 1.8 | 1.2 | 650 |
| 17 | 1.5 | 2.0 | 1.4 | 590 |

As shown in Table 2, in each of the sample Nos. 12 to 15 in which the holding time of the maximum temperature during firing was within the range of 3 hours to 20 hours, the void rate was 0.3% to 1.5%, and the abrasion depth of 1.2 μm or less and the radial crushing strength of 700 MPa or more were obtained.

EXAMPLE 3

Next, except for various changes of the temperature drop rate from the maximum temperature to 1200° C. during firing as shown in Table 3, sample Nos. 18 to 22 were manufactured using the method similar to the sample No. 7 of Example 1. Similar to Example 1, each sample was prepared in which the outer diameter was 12 mm, the inner diameter was 10 mm, and the width (W) was 2 mm, and in the cross-sectional view, as the fishing line guide member 1 shown in FIG. 2, the curvature radius R1 was 4.5 mm, and the curvature radius R2 was 0.8 mm.

Moreover, with respect to the value of $I_M/I_S$ of each sample, CuKα rays were radiated on the surface of the sample using the X-ray diffractometer (D8 ADVANCE manufactured by Bruker AXS corporation), the X-ray diffraction chart was obtained, which was the result obtained by scanning the angle difference (2θ) between the diffraction direction and the incident direction of the CuKα ray and the intensity of the diffraction X-ray using a detector, the peak intensity $I_M$ and $I_S$ of 2θ=37.2° and 2θ=27.0° was confirmed, and the value of $I_M/I_S$ of each sample was calculated by obtaining the rate.

In addition, with respect to sample Nos. 18 to 22, the abrasion test and the radial crushing strength test similar to Example 1 were performed, and the abrasion depth and the radial crushing strength of each sample were obtained. The results are shown in Table 3.

TABLE 3

| Sample No. | Temperature Drop Rate (° C./min) | $I_M/I_S$ (—) | Abrasion Depth (μm) | Radial Crushing Strength (MPa) |
| --- | --- | --- | --- | --- |
| 18 | 4 | 0.15 | 1.3 | 620 |
| 19 | 5 | 0.10 | 1.2 | 700 |
| 20 | 8 | 0.06 | 1.2 | 880 |
| 21 | 10 | 0.04 | 1.1 | 1010 |
| 22 | 12 | 0.02 | 1.2 | 940 |

As shown in Table 3, in each of the sample Nos. 19 to 21 in which the temperature drop rate was 5° C./min to 10° C./min, $I_M/I_S$ was less than or equal to 0.1, and the abrasion depth of 1.2 μm or less and the radial crushing strength of 700 MPa or more were obtained.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

REFERENCE SIGNS LIST

1, 6, 11, 14: Fishing line guide member
2: First curve surface
2': Second curve surface
3: Guide hole
4: Outer circumference
5: Fishing line
7: Flange portion
10: Fishing line guide
12: Holding portion
13: Attachment portion
20: Fishing rod
30: Abrasion resistance evaluation device
40: Ceramic jig

The invention claimed is:
1. A fishing line guide member, comprising:
a guide member having a ring shape which defines an inner circumferential side space serving as a guide hole for a fishing line and has a curve surface curved from an inner circumferential side toward an outer circumferential side of the ring shape in a cross-sectional view with respect to a cross-section of the guide member taken along a cut plane including an axis line L of the guide member which passes through a center of the guide hole for the fishing line,
the curve surface of the guide member having
a maximum width W in the cross-sectional view demarcated by boundary line B-B' extending through the curve surface in a direction parallel to the axis line L passing through the center of the guide hole and
a maximum thickness T in the cross-sectional view in a direction transverse to axis line L and demarcated by boundary line A-A' extending from the inner circumferential side to the outer circumferential side of the guide member;

the inner circumferential side being on a side of the guide hole for the fishing line, the outer circumferential side being opposed to the guide hole for the fishing line, and the boundary line B-B' through the curve surface demarcating the inner circumferential side from the outer circumferential side of the curve surface, an inner circumferential side curve surface of the curve surface comprising:

a first curve surface portion having a curvature radius R1 and extending from an inner end A of boundary line A-A' to ends of a boundary line D-D' parallel to and spaced from boundary line B-B';

a second curve surface portion having a curvature radius R2 and extending from the ends of boundary line D-D' to ends of boundary line B-B', where curvature radius R1 is larger than curvature radius R2; and a third curve surface portion having a curvature radius R3 and being located on the outer circumferential side of the curve surface and extending from the ends of boundary line B-B', the radius R1 being greater than radius R2, and the radius R3 being equal to or greater than radius R2, and a ratio T/W of the maximum thickness T to the maximum width W being 0.2 or more and 0.7 or less.

2. The fishing line guide member according to claim 1, wherein a value of R1/R2 ratio is equal to or more than 3.

3. The fishing line guide member according to claim wherein a value of R3/R2 ratio is equal to or more than 1.2.

4. The fishing line guide member according to claim 1, further comprising a flange portion provided on the outer circumferential side, wherein in the cross-sectional view, at least a portion of an outer surface of the flange portion in which one end is connected to the inner circumferential side part of the curve surface is a curve surface, and R4 is equal to or more than R2, in which R4 denotes a curvature radius of the curve surface.

5. The fishing line guide member according to claim 4, wherein in the cross-sectional view, the flange portion includes an inner surface extending from the other end of the outer surface in a thickness direction of the fishing line guide member, and includes a recessed portion in at least a portion of the inner surface.

6. A fishing line guide, comprising:

the fishing line guide member according to claim 1;

a holding portion which holds the fishing line guide member; and an attachment portion which attaches the holding portion to a fishing rod.

7. A fishing rod, comprising:

a rod body: and the fishing line guide according to claim 6, the fishing line guide being attached to the rod body.

* * * * *